United States Patent [19]
Clough

[11] 3,806,098
[45] Apr. 23, 1974

[54] VERTICAL AERATING SYSTEM
[75] Inventor: Roy L. Clough, Bristol, N.H.
[73] Assignee: Xodar Corporation, Warwick, R.I.
[22] Filed: July 11, 1972
[21] Appl. No.: 270,600

[52] U.S. Cl................................ 259/101, 261/124
[51] Int. Cl............................................. B01f 11/00
[58] Field of Search............. 259/100, 101, 1, 2, 20, 259/38, 39; 261/124, 93, 122

[56] References Cited
UNITED STATES PATENTS
| | | | |
|---|---|---|---|
| 3,664,647 | 6/1972 | Snow | 261/122 |
| 3,083,953 | 4/1963 | Langdon | 261/122 |
| 2,978,234 | 4/1961 | Lamb | 261/122 |
| 2,947,525 | 8/1960 | Klein | 261/122 |

Primary Examiner—Robert W. Jenkins
Attorney, Agent, or Firm—Schiller and Pandiscio

[57] ABSTRACT

The invention is a system for simultaneously aerating and agitating a body of liquid. The system comprises a hollow body that is pivotally supported from one end in a pool of liquid. The body has a negative buoyancy so that its unsupported end tends to hang down in the liquid. Means are provided for introducing a gas into the body at its unsupported end to aerate and displace liquid therein. The body is adapted to trap sufficient gas to provide a buoyancy force that causes the body to pivot and rise in the liquid. Means are also provided for releasing the gas trapped by the body when it has pivoted to a predetermined angular position, with the result that the body begins to fall and to fill with liquid from near the surface of the body of liquid. The body pivots on its support in cyclic fashion.

18 Claims, 7 Drawing Figures

PATENTED APR 23 1974 3,806,098

VERTICAL AERATING SYSTEM

This invention relates to the contacting of liquids and gases and more particularly to aeration and agitation of bodies of water as found, for example, in pools, tanks and the like.

Commercial fish farming in tanks, pools and the like offer a number of advantages such as elimination of predators and unwanted species, high feed efficiency and ease of harvest. As may be expected, efficient and reliable aerating equipment is required to adequately aerate the water so as to provide sufficient oxygen for the fish. The usual practice is to direct air or oxygen into the water near the bottom of the tank or pool in finely divided form so that it will pass upwards through and be dissolved in the water. However, aerating means heretofore available have not been fully satisfactory because of high installation and maintenance costs and low efficiency resulting in high input air requirements. Additionally, high input rate aerating systems may agitate the water enough to disturb the fish and may effect growth and reproduction. Furthermore, although the air or oxygen may be introduced into the water at or adjacent the bottom of the pool or tank, the air bubbles tend to rise rapidly with the result that most of the aerated water will be found near the water surface. This may result in the fish crowding at or near the water surface. A further problem is the substantial temperature fluctuations which may occur at or near the surface of water as a result of heating by sunlight during daylight hours and cooling during evening hours. Accordingly, additional means are often required to circulate the water to reduce temperature gradients and fluctuations. In addition to the disadvantages of increased installation and maintenance costs, such circulating systems may also agitate the water enough to disturb the fish, and may affect growth and reproduction.

OBJECTS AND SUMMARY OF THE INVENTION

A primary object of this invention is thus to provide novel apparatus and apparatus for agitating and aerating a body of liquid.

A further primary object of this invention is to provide a novel method and apparatus for agitating and aerating the water in a fish tank.

A more specific object is to provide novel apparatus for aerating and agitating a pool of water that is adapted to provide a more uniform dispersion of dissolved oxygen in the water.

Another specific object is to provide aerating apparatus that combines the functions of agitation and circulation in a unique and novel manner.

A further object is to provide an agitating and aerating apparatus that is simple and inexpensive to construct.

The foregoing and other objects hereinafter described or rendered obvious are achieved by means of an elongate, water displacing body which is pivotally supported from one end thereof in a pool or tank of water and is adapted to at least partially fill with water and to normally assume a substantially vertical position. Means are provided for injecting a gas (e.g. air or molecular oxygen) into the body to displace the water therein and the body is adapted to trap the gas so as to provide a buoyancy force that causes the unsupported end to rise in the water, with the result that the body will begin to pivot about the support. Means are also provided for releasing air trapped by the body when the latter has pivoted up to a predetermined angular position, whereby the buoyancy force is dissipated and the unsupported end fills again with water and falls. The body oscillates in a pivoting manner, so that the oscillating action of the body agitates the water, and the body circulates water in the tank from near the surface to near the bottom.

Other features and advantages of the invention are described or rendered obvious in the following detailed description which is to be considered together with the accompanying drawings, wherein.

Figure 1:
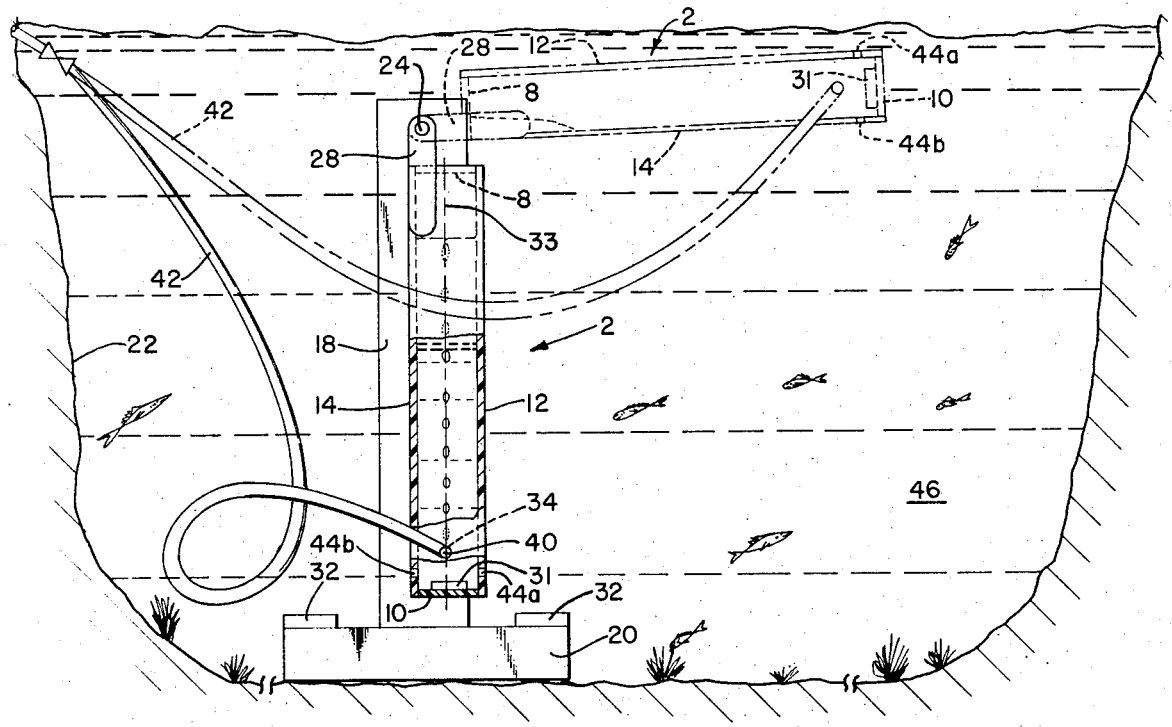
FIG. 1 is a side elevational view, partly in section, of a preferred embodiment of an aerating and agitating body constructed in accordance with the invention, mounted in a fish tank.
Figure 2:
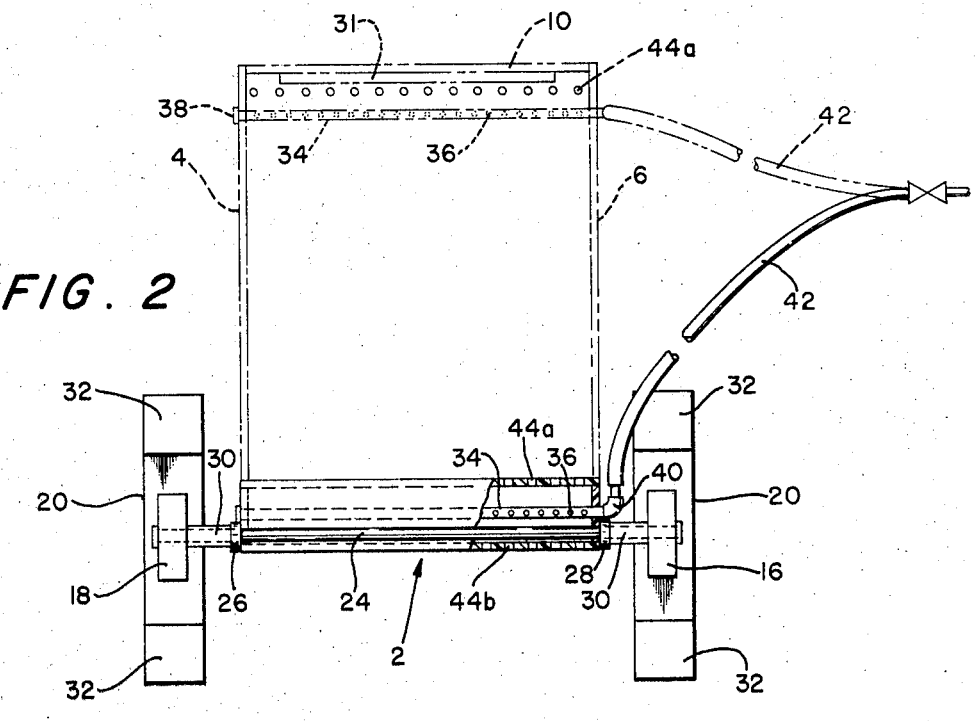
FIG. 2 is a plan view, partly in section, of the apparatus of FIG. 1.
Figure 3:
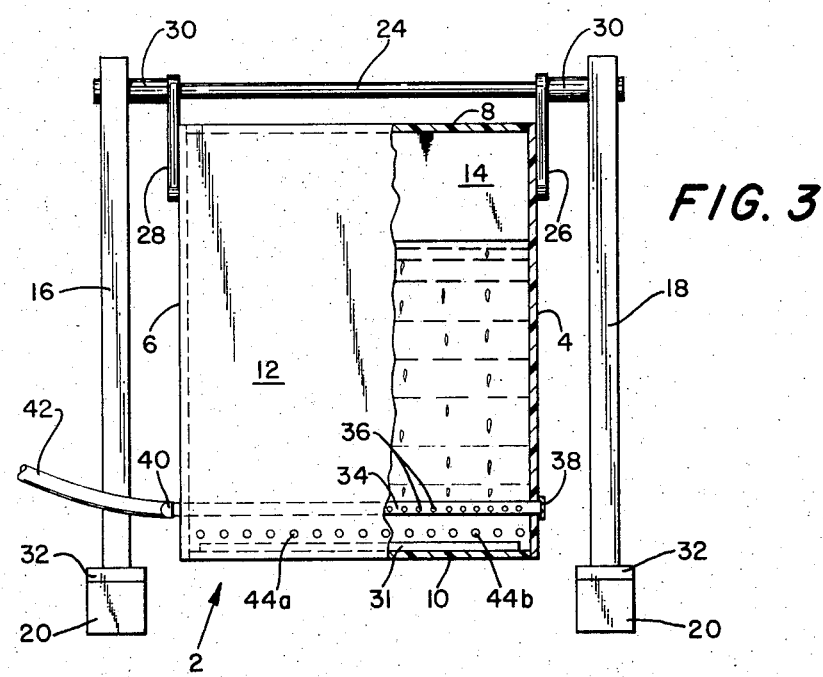
FIG. 3 is an end view in elevation, partly in section, of the same apparatus.

Referring now to FIGS. 1–3, the illustrated aerating and agitating apparatus comprises a hollow box-like body 2 that has a rectangular frame formed by side members 4 and 6, end members 8 and 10 and wall members 12 and 14 that overlie and are secured to the frame. The body is pivotally mounted to a pair of spaced vertical supports 16 and 18 that are affixed to identical base members 20 that rest on the bottom of a fish tank 22. This is accomplished by means of an axle or pivot shaft 24 that extends through aligned holes in brackets 26 and 28 which in turn are attached to side frame members 4 and 6 respectively adjacent end member 8. The axle is anchored in the supports 16 and 18. The body has a negative buoyancy so that its unsupported end, i.e. at members 10, wants to fall, whereby the body tends to assume a substantially vertical orientation. The body is rotatable on axle 24 and is restrained against sidewise movement by spacers 30 mounted on the axle.

As mentioned previously, the pivotal body 2 per se has a negative buoyancy in the liquid. The buoyancy of the overall apparatus should be negative or the support structure anchored in place in the tank 22 to prevent it from floating to the surface.

Accordingly, by way of example but not limitation, the body 2, supports 16 and 18, and base members 20 all may be made of metal or a material such as wood or plastic. If the body 2 is made of a material having a positive or neutral buoyancy, e.g. wood or a light weight plastic composition, it must be ballasted as, for example, by a metal weight 31 attached to its end wall member 10 so that it will hang down as shown in full lines in FIG. 1. It also is contemplated that frame members 4–10 may be hollow and filled with a suitable ballast such as sand or gravel so as to provide adequate negative buoyancy.

If the supporting structure (elements 16, 18 and 20) are made of positive or neutral buoyancy material, they may be held down by suitable ballast, e.g. metal weights 32. The wall members 12 and 14 are impervious to water and preferably are sheets of a substantially rigid plastic, e.g. polyethylene or polypropylene. Such sheets are preferably cemented to the frame members 4–10 which also are preferably plastic so that a strong, water-tight seal is formed around its entire perimeter.

As mentioned previously, the body 2 has a negative buoyancy and is pivotally supported so that the unsupported end, i.e. at frame member 10, wants to fall, whereby the body will tend to assume a substantially vertical orientation. Accordingly, the pivot shaft 24 is secured to the body 2 adjacent one end, beyond the end of the body per se as by attachment to brackets 28 as shown in FIG. 1; or it can be secured through one end of the body per se as shown in FIG. 6. The body may be supported with the pivot axis eccentric to the plane of the center of gravity of the body indicated by line 33 in FIG. 1, whereby the body may tend to oscillate to one side as will be hereinafter described. Alternatively, the body may be supported with the pivot axis substantially in the plane of the center of gravity of the body indicated by line 33 in FIG. 5, whereby the body may tend to oscillate to either side as will be hereinafter described. However, eccentric support is preferred for many installations.

Also forming part of the apparatus of FIGS. 1–3 is an air feeding means in the form of a perforated pipe 34 that is disposed inside body 2 in the unsupported end. Pipe 34 is provided with a series of small discharge openings 36, preferably arranged in one or more laterally-extending rows, and is sealed at one end by cap 38. Preferably thee pipe (and optionally the cap as well) are made of a porous plastic or ceramic in which case the openings 36 may be the pores of the pipe material. Porous plastic pipe is available, e.g. from the Borg Warner Company, Inc., that has a relatively large number of pores, typically 100 or more pores per linear inch for 9/16 inch diameter pipe. Pipe 34 has an air inlet to which is mounted an elbow fitting 40 that also is connected by a flexible hose 42 to a suitable air supply means (not shown). The gas supply means may consist of a compressor supplying air to a plenum to which the air hose is connected; preferably, however, the air supply consists of a variable flow rate pump driven by an electric motor.

Additionally, the body has one or more rows of openings 44a and 44b, formed in side wall members 12 and 14 respectively. In the embodiment shown in FIGS. 1–3, the openings 44a and 44b are located at the unsupported end between the end member 10 and the perforated pipe 34. Openings 44a and 44b preferably have a size in the range of from about ½ to 2 inches in diameter and are spaced about ½ to 4 inches apart. Alternatively, openings 44a and 44b may comprise one or more elongated slots in the side wall members 12 and 14.

Operation of the apparatus of FIGS. 1–3 whereby agitation, aeration and water circulation are produced will now be described. Assuming that the device is placed in a pool of water 46 and that no air is flowing through the hose 42, water will tend to flow into the body 2 through openings 44b and the body will at least partially fill with water, and the unsupported end will fall and the body will assume a substantially vertical orientation. Air under pressure is now introduced into pipe 34 via hose 42. The air is discharged from the pipe 34 via openings 36. Since the pipe 34 is located above openings 44a and 44b, the discharging air bubbles up through the water trapped inside the body and accumulates in the top part of the body, i.e. adjacent end member 8. It should be noted that the air aerates water in the body 2, i.e. some air is dissolved in the water, as it rises through it. The rising air also displaces water in the body, forcing the water out thorugh openings 44a and 44b. As the volume of air accumulating in body 2 increases, the body begins to assume positive buoyancy and begins to rise. Because the pivot axis is eccentric to the plane of the center of gravity of the body, the body tends to pivot upwardly in a counterclockwise direction (as seen in FIG. 1). As the body passes the horizontal position, the air trapped therein will tend to move toward openings 44a and will reach them as the body continues to rise. As soon as the trapped air reaches openings 44a, it begins to escape through those holes, whereby the buoyancy force is deminished. The rate at which the buoyancy force is dissipated depends on the number and size of holes 44a and the rate at which air is being pumped into the body 2 via pipe 34. As the air escapes, water begins to be taken into the body through openings 44b. As a consequence, the body 2 again assumes a negative buoyancy which causes it to pivot clockwise back toward its original vertical position. As the body swings down, it begins to refill with air which in turn displaces water therein, with the result that it will again rise to a level at which the air can escape and water will be taken in as above described. Thus, the body will oscillate to one side about its pivot with the frequency of its up and down movement depending upon the location, number and size of openings 44a and 44b, the interior volume of the body 2, and the rate at which air is fed into the body via pipe 34.

It is to be noted that the aeration of the water in the body takes place under pressure since the water level is forced down. As the body pivots in the pool, it agitates the water and thereby helps circulate the water. Additionally, the body takes in water adjacent the surface and discharges it at a lower level, e.g. adjacent the bottom of the pool, thus providing for additional circulation. Further, the body discharges aerated water substantially throughout its cycle including lower levels of the pool, thus providing additional dispersion of aerated water at all levels of the pool. Also, the gas bubbles escaping through openings 44a provide efficient aeration due to intimate contact with the water. Preferably the operating parameters, notably the rate at which air is delivered to the pipe and the number and sizes of openings 44a and 44B, are set so that the body drops to substantially a vertical position in its oscillating mode, with the result that water taken in at or near the surface begins to be discharged at a lower point in the pool than is the case if the body starts to rise again before it reaches a substantially vertical position on its downward swing.

It is to be noted that the holes 44a serve three functions. One function is to discharge the water that is displaced by the incoming gas as the body is filling with gas. The second function is to determine the angle to which the aerating body can tilt, since the closer the holes are to the unsupported end of the body, the greater the body must pivot before the trapped gas will begin to escape. The third function is to control the size of the streams of escaping air. Preferably smaller and more holes 44a are used since smaller holes permit the air to escape as small bubbles that are more easily dissolved in the water.

The holes 44b serve two functions. One function is to discharge water that is displaced by the incoming gas as the body is filling with gas. The second function is to permit intake of water from near the surface as air escapes from the body.

Obviously the aerating body may be oriented so that its axle extends either transversely or longitudinally in the pool or tank. Furthermore, more than one aerating body may be used in the same pool or tank and they may be located either close together or in widely spaced relation to each other.

It also is contemplated that the flow of air into the body need not be continuous. Instead air may be delivered to the body 2 until the latter rises to the point where its trapped air begins to be released, whereupon the flow of air is terminated and is resumed after the body has again reached its lowermost position in the pool of water.

Figure 4:
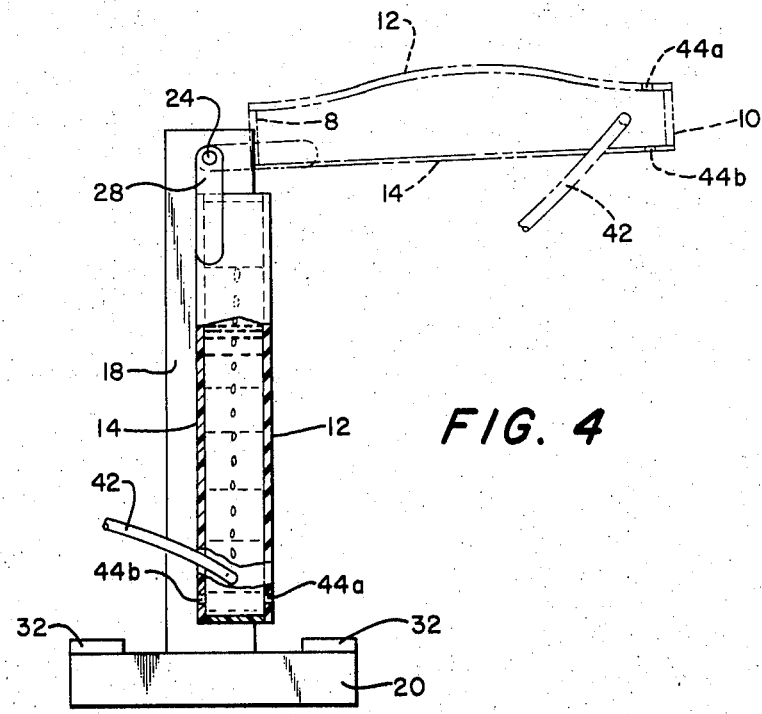
FIG. 4 is a side elevational view, partly in section, of another embodiment of the invention.

FIG. 4 shows a modification of the invention. This embodiment differs from that of FIGS. 1–3 in that wall member 12 is a sheet of flexible water-resistant material. The sides and ends of the sheet are secured to the frame by a suitable means, e.g. by means of a strong water-resistant cement, although it is contemplated that the sheet could be secured to the frame members by suitable mechanical means. The sheet is cut and mounted so that it can balloon or belly away from the frame when the body is pivoted upwardly as shown in FIG. 4. The wall member 12 is also provided with a series of air discharge openings 44a, preferably arranged in one or more laterally-extending rows at the unsupported end of the body, i.e. adjacent frame member 10.

The apparatus of FIG. 4 has the same mode of operation as that of FIGS. 1–3 except that air introduced into the body causes the flexible wall member 12 to balloon away from the frame. This ballooning extends the air capacity of body 2 and thus provides more aeration of water at the surface of the pool.

Figure 5:
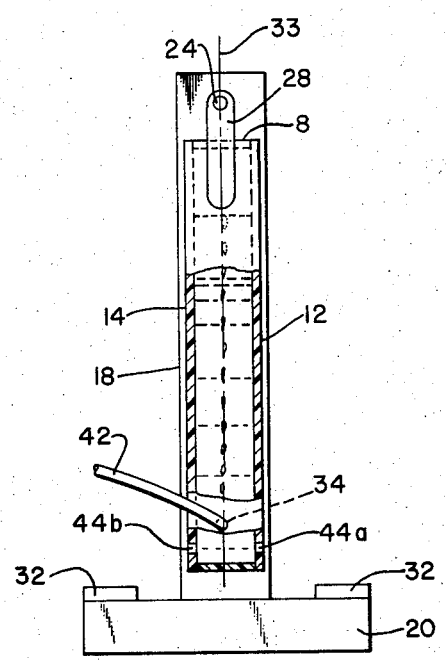
FIG. 5 is a side view in elevation, partly in section, of another embodiment of the invention.
Figure 6:
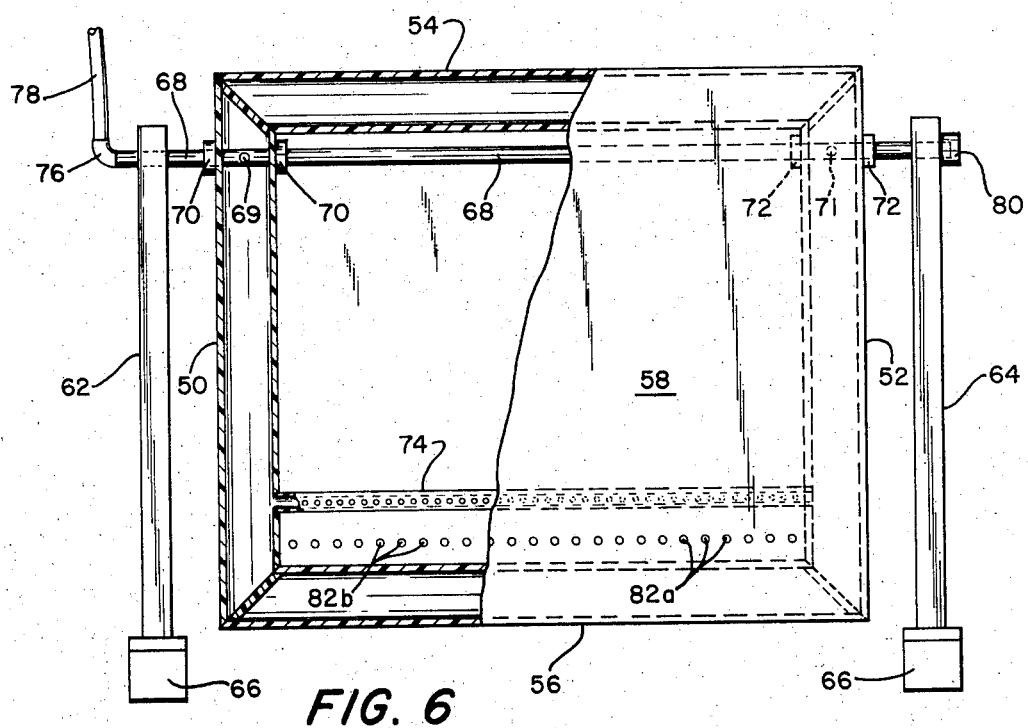
FIG. 6 is an end elevational view, partly in section, of still another embodiment of the invention.

FIG. 5 shows still another embodiment of the invention. The embodiment of FIG. 5 is similar to that of FIGS. 1–3 except that the pivot shaft 24 is secured to the body substantially in the plane of the center of gravity, e.g. as shown by line 33.

The apparatus of FIG. 5 has a mode of operation similar to that of FIGS. 1–3 except that it may pivot around the axle 24 to both sides in substantially regular fashion, provided the air input to the body is rapid enough to catch the body past dead center on the return swing. Otherwise the body may pivot around axle 24 to either side in more or less random fashion.

Figure 7:
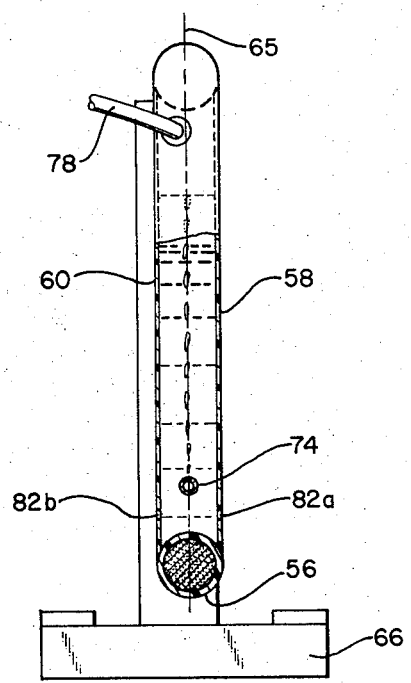
FIG. 7 is a side elevational view of the embodiment of FIG. 6.

FIGS. 6 and 7 show still another modification of the invention. In this embodiment the frame members comprise side members 50 and 52 and end members 54 and 56, all formed of hollow pipes, interconnected to each other at the ends thereof to form a rectangular structure. The ends of members 54 and 56 are sealed off from members 50 and 52 and preferably the bottom end member is filled with a suitable ballast, e.g. sand, to cause the body to normally assume a vertical or near-vertical position as shown in FIG. 7. The frame is covered with suitable water impervious wall members 58 and 60 (which can be either rigid or flexible). The body is pivotally mounted to a pair of spaced vertical supports 62 and 64 that are affixed to identical base members 66 by an axle 68 that extends through aligned holes in the side members 50 and 52 adjacent one end thereof and in the supports 62 and 64. The holes in the side members 50 and 52 are off center of the central axis of side members 50 and 52 as shown by line 65 such that the pivot axis is eccentric to the plane of the center of gravity of the body. The body is rotatable on axle 68 and is restrained against transverse movement by spacers 70 and 72 mounted on the axle. Spacers 70 and 72 also act as washers to seal the holes in the side members 50 and 52 which axle 68 extends through.

Axle 68 is hollow and together with hollow frame members 50 and 52 provides means for feeding air into the body via a perforated pipe 74 disposed inside the body and located close to the unsupported end, i.e. near frame member 56. To this end axle 68 is provided with one or more air ports 69 and 71 that serve to discharge air into the interiors of frame members 50 and 52. The latter in turn have aligned holes in which are secured the ends of perforated pipe 74. Attached to one end of axle 68 is an elbow fitting 76 that is connected by a flexible hose 78 to a suitable air supply means (not shown). The other end of axle 68 is closed off by a cap 80.

Completing the device are one or more rows of openings 82a and 82b, formed in side wall members 58 and 60 respectively. Openings 82a and 82b are located close to end wall 56 between the end wall and perforated pipe 74.

The apparatus of FIGS. 6 and 7 has the same mode of operation as the apparatus of FIGS. 1–3. In this case, however, air is directed into the pipe 74 via the discharge ports 69 and 71 of axle 68 and the hollow side frame members 50 and 52.

It is to be appreciated that although the frame and base are preferably made of polymeric materials such as plastic, they also may be made of a suitable metal or metal alloy that is capable of withstanding corrosion in water. Plastic is preferred because of its low cost and because it is available in compositions which are resistant to water. Making the frame and base of plastic or metal hollow pipe offers the advantage that the frame and base are thus adapted to accommodate suitable ballast to help maintain the device submerged in the water.

The side walls, e.g. walls 12 and 14, may be made of various materials. The essential requirement is that the material be impervious to water and to the aerating gas, sufficiently strong to withstand the operating pressure, and capable of being securely anchored to the frame. Preferably they are made of a rigid plastic such as polyvinylchloride, polyethylene, polypropylene and the like or a flexible plastic or natural or synthetic rubber. It is also contemplated that the side walls may be reinforced. This can be achieved by embedding reinforcing elements such as glass or metal filaments directly into the sheet material or by cementing reinforcing elements such as nylon tape directly to the surface of these sheets. The reinforcing elements also may be applied to the edges of the diaphragm so as to provide reinforcement in those locations.

Of course, it is not necessary for the aerating body to be rectangular as shown. Thus, for example, the aerating body may be square or trapezoidal.

Still other modifications will be obvious to persons skilled in the art.

It is believed to be apparent from the foregoing description that this invention offers a number of advantages. For one thing, the aerating body is relatively inexpensive and easy to construct. Another advantage is that a plurality of these aerating bodies may be positioned in one pool or tank at selected points to optimize aeration and agitation. Another advantage of the invention is that the aerating device discharges aerated water at or near the bottom of the tank or pool where the concentration of air is normally the lowest. A further advantage is that it is efficient and it promotes a more uniform dispersion of aerating fluid, so that the amount of air required to be delivered into a pool of water to produce a given oxygen level is minimized. It will be appreciated by one skilled in the art that the aerating devices of the present invention herein described may also be used to aerate and agitate aerobic sewage and industrial waste and the like.

What is claimed is:

1. Apparatus for aerating and agitating a liquid in which it is submerged, said apparatus comprising a hollow body having first and second opposite ends, means for pivotally suspending said body from said first opposite end, said body having a negative buoyancy with respect to said liquid and being adapted to assume a position in which said ends are aligned in a substantially vertical plane, said body also being adapted to trap a quantity of gas sufficient to exert a positive buoyancy force to cause said body to pivot and rise in the liquid, and means at said second opposite end of said body for releasing gas trapped in said body and for taking in liquid when said body has pivoted to a predetermined angular position to dissipate the positive buoyancy force exerted by said trapped gas.

2. Apparatus as defined in claim 1 wherein said body is suspended about a pivot axis eccentric to the center of gravity of said body.

3. Apparatus as defined in claim 1 wherein the body is suspended about a pivot axis that is substantially in a plane passing through the center of gravity of said body when positioned in said substantially vertical plane.

4. Apparatus as defined in claim 1 including means located in said body for introducing gas to the interior of said body.

5. Apparatus as defined in claim 1 wherein said body has one or more openings in either side proximate said second opposite end thereof.

6. Apparatus as defined in claim 5 wherein said means for introducing gas is located adjacent said second opposite end thereof between said openings and said pivot suspension means.

7. Apparatus as defined in claim 1 wherein said body comprises an open frame covered on both sides thereof by substantially rigid, liquid impervious sheet material.

8. Apparatus as defined in claim 1 wherein said body comprises an open frame covered on one side by a substantially rigid, liquid impervious sheet material and on the other side by a flexible, liquid impervious sheet material.

9. Apparatus as defined in claim 8 wherein said flexible sheet material is resiliently deformable.

10. In combination with a holder for a liquid having lateral boundaries and a bottom, an aerating system for simultaneously aerating and agitating said liquid, said system comprising:
  a hollow body having a negative buoyancy disposed in said liquid;
  support means;
  suspension means connected to said support means for pivotally suspending said body from said support means, said suspension means being connected to said body adjacent one end thereof so that said body normally assumes a substantially vertical orientation in said liquid;
  said body being adapted to trap therein a quantity of gas sufficient to exert a positive buoyancy force to cause said body to pivot and rise in said liquid;
  means for releasing gas trapped therein and for taking in liquid when said body has pivoted to a predetermined angular position to dissipate the positive buoyancy force exerted by said trapped gas; and
  means for directing gas into said body.

11. The combination as defined in claim 10 wherein the pivot axis of said body is eccentric to the center of gravity of said body.

12. The combination as defined in claim 10 wherein said means for releasing gas and for taking in liquid comprises one or more openings in said body.

13. The combination as defined in claim 10 wherein said means for directing gas into said body comprises a gas discharge means located within said body.

14. The combination as defined in claim 10 wherein said body comprises an open frame covered on both sides thereof by liquid impervious sheet material.

15. A method of aerating and agitating a body of liquid comprising submersing in said liquid a hollow body that is elongated in one plane and has a negative buoyancy, suspending said body in said liquid on a pivot support axis located adjacent one end thereof, whereby said body tends to assume a position in which said plane is substantially vertical, injecting a gas into the hollow body so as to displace liquid therefrom and thereby cause the hollow body to pivot and rise in said liquid, releasing gas from said hollow body as it rises to a predetermined angular position, and taking liquid into said hollow body so that it loses buoyancy and thereby falls in said liquid.

16. Method as defined in claim 14 wherein said liquid is discharged at or near the bottom of said body of liquid.

17. Method as defined in claim 15 wherein said liquid is taken into said body at or near the surface of said body of liquid.

18. Method as defined in claim 15 comprising taking liquid into said body substantially simultaneously as gas is released therefrom.

* * * * *